(12) United States Patent
Rhoads et al.

(10) Patent No.: US 8,543,661 B2
(45) Date of Patent: Sep. 24, 2013

(54) FINGERPRINTS AND MACHINE-READABLE CODES COMBINED WITH USER CHARACTERISTICS TO OBTAIN CONTENT OR INFORMATION

(75) Inventors: Geoffrey B. Rhoads, West Linn, OR (US); Anthony Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 13/337,511

(22) Filed: Dec. 27, 2011

(65) Prior Publication Data

US 2012/0131140 A1 May 24, 2012

Related U.S. Application Data

(60) Division of application No. 11/058,917, filed on Feb. 15, 2005, now Pat. No. 8,108,484, which is a continuation-in-part of application No. 09/571,422, filed on May 15, 2000, now Pat. No. 6,947,571, and a continuation-in-part of application No. 09/343,104, filed on Jun. 29, 1999, now abandoned, and a continuation-in-part of application No. 09/342,971, filed on Jun. 29, 1999, now abandoned, and a continuation-in-part of application No. 09/342,689, filed on Jun. 29, 1999, now Pat. No. 6,311,214, and a continuation-in-part of application No. 09/531,076, filed on Mar. 18, 2000, now Pat. No. 8,180,844, and a continuation-in-part of application No. 09/547,664, filed on Apr. 12, 2000, now Pat. No. 7,206,820, and a continuation-in-part of application No. 09/552,998, filed on Apr. 19, 2000, now abandoned, said application No. 11/058,917 is a continuation-in-part of application No. 09/636,102, filed on Aug. 10, 2000, now abandoned, and a continuation of application No. 09/915,824, filed on Jul. 26, 2001, now abandoned, and a continuation-in-part of application No. 10/717,211, filed on Nov. 18, 2003, now abandoned, which is a continuation of application No. 09/342,688, filed on Jun. 29, 1999, now Pat. No. 6,650,761, which is a continuation-in-part of application No. 09/314,648, filed on May 19, 1999, now Pat. No. 6,681,028.

(60) Provisional application No. 60/158,015, filed on Oct. 6, 1999, provisional application No. 60/163,332, filed on Nov. 3, 1999, provisional application No. 60/164,619, filed on Nov. 10, 1999, provisional application No. 60/220,945, filed on Jul. 26, 2000.

(51) Int. Cl.
*G06F 15/16* (2006.01)

(52) U.S. Cl.
USPC .......................................... 709/217; 709/219

(58) Field of Classification Search
None
See application file for complete search history.

(56) References Cited

U.S. PATENT DOCUMENTS 3,919,479 A 11/1975 Moon et al.
4,230,990 A 10/1980 Lert et al.
(Continued)

FOREIGN PATENT DOCUMENTS

GB 2258065 1/1993
JP 2003304388 A * 10/2003
(Continued)

OTHER PUBLICATIONS

U.S. Appl. No. 09/343,104, filed Jun. 29, 1999, Tony F. Rodriguez, et al.

(Continued)

*Primary Examiner* — Jeffrey R Swearingen (57) ABSTRACT

The present invention relates generally to processing audio and video data. One claim recites a method of accessing content stored in a remote database. The method includes: receiving video or audio data; decoding an auxiliary machine-readable code from the video or audio data; deriving a fingerprint, which fingerprint is separate from the machine-readable code, from the video or audio data itself; providing user characteristics or an index to user characteristics; and by using the machine-readable code, fingerprint and user characteristics or information obtained with the index to user characteristics, accessing the content stored in the remote database. Of course, additional combinations and claims are provided as well.

20 Claims, 4 Drawing Sheets

(56) References Cited

U.S. PATENT DOCUMENTS

| | | |
|---|---|---|
| 4,499,601 A | 2/1985 | Matthews |
| 4,674,041 A | 6/1987 | Lemon |
| 4,682,370 A | 7/1987 | Matthews |
| 4,697,209 A | 9/1987 | Kiewit |
| 4,739,398 A | 4/1988 | Thomas et al. |
| 4,945,412 A | 7/1990 | Kramer |
| 4,994,987 A | 2/1991 | Baldwin |
| 5,119,507 A | 6/1992 | Mankovitz |
| 5,134,719 A | 7/1992 | Mankovitz |
| 5,315,098 A | 5/1994 | Tow |
| 5,410,598 A | 4/1995 | Shear |
| 5,415,553 A | 5/1995 | Szmidla |
| 5,444,779 A | 8/1995 | Daniele |
| 5,450,490 A | 9/1995 | Jensen et al. |
| 5,473,631 A | 12/1995 | Moses |
| 5,481,294 A | 1/1996 | Thomas et al. |
| 5,485,518 A | 1/1996 | Hunter et al. |
| 5,519,778 A | 5/1996 | Leighton et al. |
| 5,526,022 A | 6/1996 | Donahue et al. |
| 5,534,917 A | 7/1996 | MacDougall |
| 5,563,988 A | 10/1996 | Maes et al. |
| 5,574,962 A | 11/1996 | Fardeau |
| 5,577,266 A | 11/1996 | Takahisa |
| 5,579,124 A | 11/1996 | Aijala et al. |
| 5,581,276 A | 12/1996 | Cipolla et al. |
| 5,581,800 A | 12/1996 | Fardeau et al. |
| 5,584,070 A | 12/1996 | Harris |
| 5,594,469 A | 1/1997 | Freeman et al. |
| 5,602,566 A | 2/1997 | Motosyuku |
| 5,613,004 A | 3/1997 | Cooperman et al. |
| 5,629,980 A | 5/1997 | Stefik |
| 5,640,193 A | 6/1997 | Wellner |
| 5,646,997 A | 7/1997 | Barton |
| 5,646,999 A | 7/1997 | Saito |
| 5,703,795 A | 12/1997 | Mankovitz |
| 5,708,478 A | 1/1998 | Tognazzini |
| 5,721,788 A | 2/1998 | Powell et al. |
| 5,740,244 A | 4/1998 | Indeck et al. |
| 5,757,360 A | 5/1998 | Nitta et al. |
| 5,761,606 A | 6/1998 | Wolzien |
| 5,764,763 A | 6/1998 | Jensen |
| 5,765,152 A | 6/1998 | Erickson |
| 5,765,176 A | 6/1998 | Bloomberg |
| 5,774,452 A | 6/1998 | Wolosewicz |
| 5,782,692 A | 7/1998 | Stelovsky |
| 5,822,432 A | 10/1998 | Moskowitz et al. |
| 5,838,458 A | 11/1998 | Tsai |
| 5,841,978 A | 11/1998 | Rhoads |
| 5,845,281 A | 12/1998 | Benson |
| 5,848,413 A | 12/1998 | Wolff |
| 5,850,481 A | 12/1998 | Rhoads |
| 5,862,260 A | 1/1999 | Rhoads |
| 5,872,531 A | 2/1999 | Johnson |
| 5,892,536 A | 4/1999 | Logan |
| 5,892,900 A | 4/1999 | Ginter et al. |
| 5,902,353 A | 5/1999 | Reber et al. |
| 5,905,248 A | 5/1999 | Russell et al. |
| 5,917,912 A | 6/1999 | Ginter et al. |
| 5,918,214 A | 6/1999 | Perkowski |
| 5,918,223 A | 6/1999 | Blum |
| 5,923,327 A | 7/1999 | Smith et al. |
| 5,938,726 A | 8/1999 | Reber et al. |
| 5,940,595 A | 8/1999 | Reber et al. |
| 5,943,422 A | 8/1999 | Van Wie et al. |
| 5,949,885 A | 9/1999 | Leighton |
| 5,950,173 A | 9/1999 | Perkowski |
| 5,978,477 A | 11/1999 | Hull et al. |
| 5,978,773 A | 11/1999 | Hudetz et al. |
| 5,982,956 A | 11/1999 | Lahmi |
| 5,991,737 A | 11/1999 | Chen |
| 5,991,876 A | 11/1999 | Johnson et al. |
| 5,995,978 A | 11/1999 | Cullen et al. |
| 6,002,946 A | 12/1999 | Reber |
| 6,014,569 A | 1/2000 | Bottum |
| 6,058,304 A | 5/2000 | Callaghan |
| 6,064,737 A | 5/2000 | Rhoads |
| 6,064,979 A | 5/2000 | Perkowski |
| 6,067,082 A | 5/2000 | Anmei |
| 6,076,734 A | 6/2000 | Dougherty et al. |
| 6,098,106 A | 8/2000 | Philyaw et al. |
| 6,115,028 A | 9/2000 | Balakrishnan |
| 6,115,482 A | 9/2000 | Sears |
| 6,121,530 A | 9/2000 | Sonoda |
| 6,122,403 A | 9/2000 | Rhoads |
| 6,125,172 A | 9/2000 | August |
| 6,134,548 A | 10/2000 | Gottsman et al. |
| 6,138,151 A | 10/2000 | Reber et al. |
| 6,141,753 A | 10/2000 | Zhao et al. |
| 6,151,208 A | 11/2000 | Bartlett |
| 6,154,738 A | 11/2000 | Call |
| 6,182,090 B1 | 1/2001 | Peairs |
| 6,185,683 B1 | 2/2001 | Ginter |
| 6,188,010 B1 | 2/2001 | Iwamura |
| 6,199,048 B1 | 3/2001 | Hudetz et al. |
| 6,199,099 B1 | 3/2001 | German et al. |
| 6,201,554 B1 | 3/2001 | Lands |
| 6,205,249 B1 | 3/2001 | Moskowitz |
| 6,209,094 B1 | 3/2001 | Levine et al. |
| 6,219,634 B1 | 4/2001 | Levine |
| 6,229,924 B1 | 5/2001 | Rhoads et al. |
| 6,240,121 B1 | 5/2001 | Senho |
| 6,240,185 B1 | 5/2001 | Van Wie et al. |
| 6,240,459 B1 | 5/2001 | Roberts |
| 6,243,075 B1 | 6/2001 | Fishkin |
| 6,243,480 B1 | 6/2001 | Zhao et al. |
| 6,244,873 B1 | 6/2001 | Hill |
| 6,249,226 B1 | 6/2001 | Harrison et al. |
| 6,249,606 B1 | 6/2001 | Kiraly |
| 6,255,942 B1 | 7/2001 | Knudsen |
| 6,278,781 B1 | 8/2001 | Rhoads |
| 6,282,362 B1 | 8/2001 | Murphy et al. |
| 6,286,036 B1 | 9/2001 | Rhoads |
| 6,292,674 B1 | 9/2001 | Davis |
| 6,297,805 B1 | 10/2001 | Adler |
| 6,297,838 B1 | 10/2001 | Chang |
| 6,300,880 B1 | 10/2001 | Sitnik |
| 6,307,949 B1 | 10/2001 | Rhoads |
| 6,311,214 B1 | 10/2001 | Rhoads |
| 6,314,409 B2 * | 11/2001 | Schneck et al. ............ 705/54 |
| 6,314,518 B1 | 11/2001 | Linnartz |
| 6,320,965 B1 | 11/2001 | Levine |
| 6,324,573 B1 | 11/2001 | Rhoads |
| 6,330,673 B1 | 12/2001 | Levine |
| 6,330,975 B1 | 12/2001 | Bunte |
| 6,345,100 B1 | 2/2002 | Levine |
| 6,369,794 B1 | 4/2002 | Sakurai |
| 6,377,610 B1 | 4/2002 | Hagenauer et al. |
| 6,377,986 B1 | 4/2002 | Philyaw et al. |
| 6,381,341 B1 | 4/2002 | Rhoads |
| 6,385,329 B1 | 5/2002 | Sharma et al. |
| 6,389,055 B1 | 5/2002 | August |
| 6,389,538 B1 | 5/2002 | Gruse et al. |
| 6,400,272 B1 | 6/2002 | Holtzman |
| 6,400,376 B1 | 6/2002 | Singh |
| 6,408,082 B1 | 6/2002 | Rhoads et al. |
| 6,408,187 B1 | 6/2002 | Merriam |
| 6,408,331 B1 | 6/2002 | Rhoads |
| 6,411,275 B1 | 6/2002 | Hedberg |
| 6,411,725 B1 * | 6/2002 | Rhoads ............ 382/100 |
| 6,421,070 B1 * | 7/2002 | Ramos et al. ............ 715/763 |
| 6,424,725 B1 | 7/2002 | Rhoads et al. |
| 6,433,793 B1 | 8/2002 | Ootsuka |
| 6,438,393 B1 | 8/2002 | Suuronen |
| 6,442,285 B2 | 8/2002 | Rhoads et al. |
| 6,448,979 B1 | 9/2002 | Schena et al. |
| 6,449,367 B2 | 9/2002 | VanWie et al. |
| 6,466,198 B1 | 10/2002 | Feinstein |
| 6,487,421 B2 | 11/2002 | Hess |
| 6,491,217 B2 | 12/2002 | Catan |
| 6,498,628 B2 | 12/2002 | Iwamura |
| 6,505,160 B1 | 1/2003 | Levy et al. |
| 6,516,079 B1 | 2/2003 | Rhoads et al. |
| 6,516,356 B1 | 2/2003 | Bellknap et al. |
| 6,522,767 B1 | 2/2003 | Moskowitz et al. |

| | | |
|---|---|---|
| 6,522,770 B1 | 2/2003 | Seder et al. |
| 6,535,617 B1 | 3/2003 | Hannigan et al. |
| 6,542,927 B2 | 4/2003 | Rhoads |
| 6,546,113 B1 | 4/2003 | Lucas et al. |
| 6,549,933 B1 | 4/2003 | Barrett |
| 6,553,129 B1 | 4/2003 | Rhoads |
| 6,556,185 B2 | 4/2003 | Rekimoto |
| 6,560,339 B1 | 5/2003 | Iwamura |
| 6,560,349 B1 | 5/2003 | Rhoads |
| 6,567,068 B2 | 5/2003 | Rekimoto |
| 6,567,101 B1 | 5/2003 | Thomas |
| 6,567,533 B1 | 5/2003 | Rhoads |
| 6,573,883 B1 | 6/2003 | Bartlett |
| 6,577,746 B1 | 6/2003 | Evans et al. |
| 6,580,808 B2 | 6/2003 | Rhoads |
| 6,590,996 B1 | 7/2003 | Reed et al. |
| 6,590,998 B2 | 7/2003 | Rhoads |
| 6,611,599 B2 | 8/2003 | Natarajan |
| 6,611,607 B1 | 8/2003 | Davis et al. |
| 6,614,914 B1 | 9/2003 | Rhoads et al. |
| 6,624,824 B1 | 9/2003 | Tognazzini |
| 6,628,928 B1 | 9/2003 | Crosby |
| 6,636,249 B1 | 10/2003 | Rekimoto |
| 6,647,128 B1 | 11/2003 | Rhoads |
| 6,647,130 B2 | 11/2003 | Rhoads |
| 6,650,761 B1 | 11/2003 | Rodriguez et al. |
| 6,651,053 B1 | 11/2003 | Rothschild |
| 6,675,165 B1 | 1/2004 | Rothschild |
| 6,681,028 B2 | 1/2004 | Rodriguez et al. |
| 6,681,029 B1 | 1/2004 | Rhoads |
| 6,684,249 B1 * | 1/2004 | Frerichs et al. ............... 709/225 |
| 6,687,345 B1 | 2/2004 | Swartz |
| 6,694,042 B2 | 2/2004 | Seder et al. |
| 6,694,043 B2 | 2/2004 | Seder et al. |
| 6,700,990 B1 | 3/2004 | Rhoads |
| 6,700,995 B2 | 3/2004 | Reed |
| 6,704,869 B2 | 3/2004 | Rhoads et al. |
| 6,718,046 B2 | 4/2004 | Reed et al. |
| 6,718,047 B2 | 4/2004 | Rhoads |
| 6,720,949 B1 | 4/2004 | Pryor |
| 6,721,440 B2 | 4/2004 | Reed et al. |
| 6,735,324 B1 * | 5/2004 | McKinley et al. ............ 382/100 |
| 6,760,463 B2 | 7/2004 | Rhoads |
| 6,763,123 B2 | 7/2004 | Reed et al. |
| 6,765,553 B1 | 7/2004 | Odamura |
| 6,766,363 B1 | 7/2004 | Rothschild |
| 6,768,809 B2 | 7/2004 | Rhoads et al. |
| 6,775,392 B1 | 8/2004 | Rhoads |
| 6,782,115 B2 | 8/2004 | Decker et al. |
| RE38,600 E | 9/2004 | Mankovitz |
| 6,786,397 B2 | 9/2004 | Silverbrook et al. |
| 6,798,894 B2 | 9/2004 | Rhoads |
| 6,807,534 B1 | 10/2004 | Erickson |
| 6,807,676 B1 | 10/2004 | Robbins et al. |
| 6,813,366 B1 | 11/2004 | Rhoads |
| 6,820,062 B1 | 11/2004 | Gupta et al. |
| 6,829,368 B2 | 12/2004 | Meyer et al. |
| 6,834,308 B1 | 12/2004 | Ikezoye et al. |
| 6,844,871 B1 | 1/2005 | Hinckley |
| 6,879,701 B1 | 4/2005 | Rhoads |
| 6,917,724 B2 | 7/2005 | Seder et al. |
| 6,920,232 B2 | 7/2005 | Rhoads |
| 6,941,275 B1 | 9/2005 | Swierczek |
| 6,947,571 B1 | 9/2005 | Rhoads et al. |
| 6,956,564 B1 | 10/2005 | Williams |
| 6,965,682 B1 | 11/2005 | Davis |
| 6,965,683 B2 | 11/2005 | Hein, III |
| 6,965,873 B1 | 11/2005 | Rhoads |
| 6,975,746 B2 | 12/2005 | Davis et al. |
| 6,988,202 B1 | 1/2006 | Rhoads et al. |
| 6,996,252 B2 | 2/2006 | Reed et al. |
| 7,003,731 B1 | 2/2006 | Rhoads et al. |
| 7,010,144 B1 | 3/2006 | Davis et al. |
| 7,024,016 B2 | 4/2006 | Rhoads et al. |
| 7,027,614 B2 | 4/2006 | Reed |
| 7,035,427 B2 | 4/2006 | Rhoads |
| 7,044,395 B1 | 5/2006 | Davis et al. |
| 7,047,413 B2 | 5/2006 | Yacobi et al. |
| 7,050,603 B2 | 5/2006 | Rhoads |
| 7,051,086 B2 | 5/2006 | Rhoads et al. |
| 7,054,465 B2 | 5/2006 | Rhoads |
| 7,058,697 B2 | 6/2006 | Rhoads |
| 7,062,069 B2 | 6/2006 | Rhoads |
| 7,065,559 B1 | 6/2006 | Weiss |
| 7,095,871 B2 | 8/2006 | Jones et al. |
| 7,110,338 B2 | 9/2006 | Cheng et al. |
| 7,111,170 B2 | 9/2006 | Rhoads et al. |
| 7,113,614 B2 | 9/2006 | Rhoads |
| 7,139,408 B2 | 11/2006 | Rhoads et al. |
| 7,158,654 B2 | 1/2007 | Rhoads |
| 7,164,780 B2 | 1/2007 | Brundage et al. |
| 7,168,083 B2 | 1/2007 | Kalker et al. |
| 7,171,016 B1 | 1/2007 | Rhoads |
| 7,171,018 B2 | 1/2007 | Rhoads et al. |
| 7,174,031 B2 | 2/2007 | Rhoads et al. |
| 7,177,443 B2 | 2/2007 | Rhoads |
| 7,185,201 B2 | 2/2007 | Rhoads et al. |
| 7,206,820 B1 | 4/2007 | Rhoads et al. |
| 7,213,757 B2 | 5/2007 | Jones et al. |
| 7,216,368 B2 * | 5/2007 | Ishiguro ........................ 726/32 |
| 7,224,819 B2 | 5/2007 | Levy et al. |
| 7,224,995 B2 | 5/2007 | Rhoads |
| 7,248,717 B2 | 7/2007 | Rhoads |
| 7,261,612 B1 | 8/2007 | Hannigan et al. |
| 7,302,574 B2 | 11/2007 | Conwell et al. |
| 7,305,104 B2 | 12/2007 | Carr et al. |
| 7,308,110 B2 | 12/2007 | Rhoads |
| 7,308,485 B2 | 12/2007 | Roberts |
| 7,310,629 B1 | 12/2007 | Mendelson et al. |
| 7,313,251 B2 | 12/2007 | Rhoads |
| 7,319,775 B2 | 1/2008 | Sharma et al. |
| 7,330,564 B2 | 2/2008 | Brundage et al. |
| 7,333,957 B2 | 2/2008 | Levy et al. |
| 7,349,552 B2 | 3/2008 | Levy et al. |
| 7,362,781 B2 | 4/2008 | Rhoads |
| 7,369,678 B2 | 5/2008 | Rhoads |
| 7,372,976 B2 | 5/2008 | Rhoads et al. |
| 7,377,421 B2 | 5/2008 | Rhoads |
| 7,391,880 B2 | 6/2008 | Reed et al. |
| 7,403,299 B2 | 7/2008 | Takahashi |
| 7,406,214 B2 | 7/2008 | Rhoads et al. |
| 7,424,131 B2 | 9/2008 | Alattar et al. |
| 7,427,030 B2 | 9/2008 | Jones et al. |
| 7,433,491 B2 | 10/2008 | Rhoads |
| 7,444,000 B2 | 10/2008 | Rhoads |
| 7,444,353 B1 | 10/2008 | Chen |
| 7,444,392 B2 | 10/2008 | Rhoads et al. |
| 7,450,734 B2 | 11/2008 | Rodriguez et al. |
| 7,460,726 B2 | 12/2008 | Levy et al. |
| 7,466,840 B2 | 12/2008 | Rhoads |
| 7,486,799 B2 | 2/2009 | Rhoads |
| 7,500,007 B2 | 3/2009 | Ikezoye |
| 7,502,759 B2 | 3/2009 | Hannigan et al. |
| 7,508,955 B2 | 3/2009 | Carr et al. |
| 7,515,733 B2 | 4/2009 | Rhoads |
| 7,536,034 B2 | 5/2009 | Rhoads et al. |
| 7,537,170 B2 | 5/2009 | Reed et al. |
| 7,545,952 B2 | 6/2009 | Brundage et al. |
| 7,562,392 B1 | 7/2009 | Rhoads |
| 7,564,992 B2 | 7/2009 | Rhoads |
| RE40,919 E | 9/2009 | Rhoads |
| 7,587,602 B2 | 9/2009 | Rhoads |
| 7,593,576 B2 | 9/2009 | Meyer et al. |
| 7,602,978 B2 | 10/2009 | Levy et al. |
| 7,628,320 B2 | 12/2009 | Rhoads |
| 7,643,649 B2 | 1/2010 | Davis et al. |
| 7,650,009 B2 | 1/2010 | Rhoads |
| 7,653,210 B2 | 1/2010 | Rhoads |
| 7,657,058 B2 | 2/2010 | Sharma |
| 7,685,426 B2 | 3/2010 | Ramos et al. |
| 7,693,300 B2 | 4/2010 | Reed et al. |
| 7,697,719 B2 | 4/2010 | Rhoads |
| 7,711,143 B2 | 5/2010 | Rhoads |
| 7,711,564 B2 | 5/2010 | Levy et al. |
| 7,738,673 B2 | 6/2010 | Reed |
| 7,747,038 B2 | 6/2010 | Rhoads |
| 7,751,588 B2 | 7/2010 | Rhoads |
| 7,751,596 B2 | 7/2010 | Rhoads |

| | | |
|---|---|---|
| 7,756,290 B2 | 7/2010 | Rhoads |
| 7,760,905 B2 | 7/2010 | Rhoads et al. |
| 7,762,468 B2 | 7/2010 | Reed et al. |
| 7,787,653 B2 | 8/2010 | Rhoads |
| 7,792,325 B2 | 9/2010 | Rhoads et al. |
| 7,822,225 B2 | 10/2010 | Alattar |
| 7,837,094 B2 | 11/2010 | Rhoads |
| 8,355,526 B2 * | 1/2013 | Decker et al. .......... 382/100 |
| 2001/0001854 A1 | 5/2001 | Schena et al. |
| 2001/0016836 A1 | 8/2001 | Boccon-Gibod et al. |
| 2001/0021978 A1 | 9/2001 | Okayasu et al. |
| 2001/0034705 A1 | 10/2001 | Rhoads et al. |
| 2001/0044824 A1 | 11/2001 | Hunter et al. |
| 2001/0055407 A1 | 12/2001 | Rhoads |
| 2002/0001395 A1 | 1/2002 | Davis et al. |
| 2002/0009208 A1 | 1/2002 | Alattar et al. |
| 2002/0015042 A1 | 2/2002 | Robotham et al. |
| 2002/0023020 A1 | 2/2002 | Kenyon et al. |
| 2002/0027994 A1 | 3/2002 | Katayama et al. |
| 2002/0032698 A1 | 3/2002 | Cox |
| 2002/0033844 A1 | 3/2002 | Levy et al. |
| 2002/0036617 A1 | 3/2002 | Pryor |
| 2002/0048224 A1 | 4/2002 | Dygert |
| 2002/0054692 A1 | 5/2002 | Suzuki et al. |
| 2002/0057383 A1 | 5/2002 | Iwamura |
| 2002/0059580 A1 | 5/2002 | Kalker et al. |
| 2002/0062382 A1 | 5/2002 | Rhoads et al. |
| 2002/0075298 A1 | 6/2002 | Schena |
| 2002/0080271 A1 | 6/2002 | Eveleens et al. |
| 2002/0080396 A1 | 6/2002 | Silverbrook et al. |
| 2002/0083123 A1 | 6/2002 | Freedman et al. |
| 2002/0083124 A1 | 6/2002 | Knox et al. |
| 2002/0095577 A1 | 7/2002 | Nakamura et al. |
| 2002/0102966 A1 | 8/2002 | Lev et al. |
| 2002/0114488 A1 | 8/2002 | Suda |
| 2002/0131076 A1 | 9/2002 | Davis |
| 2002/0152388 A1 | 10/2002 | Linnartz et al. |
| 2002/0172394 A1 | 11/2002 | Venkatesan |
| 2002/0176003 A1 | 11/2002 | Seder et al. |
| 2002/0186886 A1 | 12/2002 | Rhoads |
| 2002/0188841 A1 | 12/2002 | Jones et al. |
| 2002/0196272 A1 | 12/2002 | Ramos et al. |
| 2003/0007662 A1 | 1/2003 | Kaars |
| 2003/0014496 A1 | 1/2003 | Spencer et al. |
| 2003/0021439 A1 | 1/2003 | Lubin et al. |
| 2003/0021441 A1 | 1/2003 | Levy et al. |
| 2003/0040326 A1 | 2/2003 | Levy et al. |
| 2003/0040957 A1 | 2/2003 | Rhoads et al. |
| 2003/0068067 A1 | 4/2003 | Fielding et al. |
| 2003/0083098 A1 | 5/2003 | Yamazaki et al. |
| 2003/0103611 A1 | 6/2003 | Lapstun |
| 2003/0105730 A1 | 6/2003 | Davis et al. |
| 2003/0123659 A1 | 7/2003 | Forstrom et al. |
| 2003/0130954 A1 | 7/2003 | Carr et al. |
| 2003/0141375 A1 | 7/2003 | Lawandy |
| 2003/0187798 A1 | 10/2003 | McKinley et al. |
| 2004/0005093 A1 | 1/2004 | Rhoads |
| 2004/0015362 A1 | 1/2004 | Rhoads |
| 2004/0190750 A1 | 9/2004 | Rodriguez et al. |
| 2004/0202348 A1 | 10/2004 | Kuzma |
| 2004/0240704 A1 | 12/2004 | Reed |
| 2004/0264733 A1 | 12/2004 | Rhoads et al. |
| 2005/0028189 A1 | 2/2005 | Heine et al. |
| 2005/0041835 A1 | 2/2005 | Reed et al. |
| 2005/0043018 A1 | 2/2005 | Kawamoto |
| 2005/0058318 A1 | 3/2005 | Rhoads |
| 2005/0091268 A1 | 4/2005 | Meyer |
| 2005/0192933 A1 | 9/2005 | Rhoads et al. |
| 2006/0013435 A1 | 1/2006 | Rhoads |
| 2006/0041591 A1 | 2/2006 | Rhoads |
| 2006/0136565 A1 | 6/2006 | Rhoads |
| 2006/0174348 A1 | 8/2006 | Rhoads et al. |
| 2006/0251291 A1 | 11/2006 | Rhoads |
| 2007/0055884 A1 | 3/2007 | Rhoads |
| 2007/0101147 A1 | 5/2007 | Brunk et al. |
| 2007/0108287 A1 | 5/2007 | Davis et al. |
| 2007/0154064 A1 | 7/2007 | Rhoads et al. |
| 2007/0185840 A1 | 8/2007 | Rhoads |
| 2007/0189533 A1 | 8/2007 | Rhoads |
| 2007/0276841 A1 | 11/2007 | Rhoads et al. |
| 2007/0276928 A1 | 11/2007 | Rhoads et al. |
| 2008/0009310 A1 | 1/2008 | Rhoads et al. |
| 2008/0014917 A1 | 1/2008 | Rhoads et al. |
| 2008/0086311 A1 | 4/2008 | Conwell et al. |
| 2008/0121728 A1 | 5/2008 | Rodriguez |
| 2008/0133555 A1 | 6/2008 | Rhoads et al. |
| 2008/0140573 A1 | 6/2008 | Rhoads et al. |
| 2008/0140714 A1 | 6/2008 | Rhoads et al. |
| 2008/0292134 A1 | 11/2008 | Sharma et al. |
| 2009/0012944 A1 | 1/2009 | Rodriguez et al. |
| 2009/0116687 A1 | 5/2009 | Rhoads et al. |
| 2009/0125475 A1 | 5/2009 | Rhoads et al. |
| 2009/0232352 A1 | 9/2009 | Carr et al. |
| 2009/0286572 A1 | 11/2009 | Rhoads et al. |
| 2009/0290754 A1 | 11/2009 | Rhoads |
| 2010/0045816 A1 | 2/2010 | Rhoads |
| 2010/0062819 A1 | 3/2010 | Hannigan et al. |
| 2010/0094639 A1 | 4/2010 | Rhoads |
| 2010/0142749 A1 | 6/2010 | Ellingson et al. |
| 2010/0172540 A1 | 7/2010 | Davis et al. |
| 2010/0198941 A1 | 8/2010 | Rhoads |
| 2011/0007936 A1 | 1/2011 | Rhoads |
| 2011/0026777 A1 | 2/2011 | Rhoads et al. |

FOREIGN PATENT DOCUMENTS

| | | | |
|---|---|---|---|
| JP | 2004023236 A | * | 1/2004 |
| JP | 2004120141 A | * | 4/2004 |
| WO | WO 9941900 | | 8/1999 |
| WO | WO 9945705 | | 9/1999 |
| WO | WO 9959275 | | 11/1999 |
| WO | WO 0219269 A2 | * | 3/2002 |

OTHER PUBLICATIONS

U.S. Appl. No. 09/343,101, filed Jun. 29, 1999, Bruce L. Davis, et al.
U.S. Appl. No. 09/413,117, filed Oct. 6, 1999, Geoffrey B. Rhoads.
U.S. Appl. No. 09/482,749, filed Jan. 13, 2000, Geoffrey B. Rhoads.
U.S. Appl. No. 09/507,096, filed Feb. 17, 2000, Geoffrey B. Rhoads, et al.
U.S. Appl. No. 09/538,493, filed Mar. 30, 2000, Geoffrey B. Rhoads.
U.S. Appl. No. 09/552,998, filed Apr. 19, 2000, Tony F. Rodriguez, et al.
U.S. Appl. No. 09/567,405, filed May 8, 2000, Geoffrey B. Rhoads, et al.
U.S. Appl. No. 09/629,649, filed Aug. 1, 2000, J. Scott Carr, et al.
U.S. Appl. No. 09/633,587, filed Aug. 7, 2000, Geoffrey B. Rhoads, et al.
U.S. Appl. No. 09/689,289, filed Oct. 11, 2000, Geoffrey B. Rhoads, et al.
U.S. Appl. No. 09/697,009, filed Oct. 25, 2000, Bruce L. Davis, et al.
U.S. Appl. No. 09/697,015, filed Oct. 25, 2000, Bruce L Davis, et al.
U.S. Appl. No. 12/872,989, filed Aug. 31, 2010, Geoffrey B Rhoads.
U.S. Appl. No. 12/912,461, filed Oct. 26, 2010, Adnan M. Alattar.
U.S. Appl. No. 12/953,190, filed Nov. 23, 2010, Geoffrey B. Rhoads.
U.S. Appl. No. 60/232,163, filed Sep. 11, 2000.
Mar. 16, 2011 BPAI Decision—Examiner Reversed; Dec. 7, 2009 Reply Brief; Aug. 29, 2007 Examiner's Answer; Mar. 14, 2006 Appeal Brief; and Jan. 31, 2005 Final Office Action; all from U.S. Appl. No. 09/697,009.
Feb. 22, 2010 Ex Parte Quayle Action; Jan. 15, 2010 Amendment; Dec. 15, 2009 Restriction Requirement; May 21, 2009 Preliminary Amendment; all from assignee's U.S. Appl. No. 11/756,432.
Nov. 23, 2009 Reply Brief; Sep. 21, 2009 Examiner's Answer: Jun. 22, 2009 Appeal Brief: May 22, 2009 Notice of Panel Decision from Pre-Appeal Brief Review: Mar. 13, 2009 Pre-Appeal Brief Request for Review; Nov. 13, 2008 final Office Action; Aug. 5, 2008 Response; Feb. 5, 2008 non-final Office Action; Nov. 5, 2007 Response; Jun. 5, 2007 non-final Office Action: Jan. 15, 2007 Appeal Brief; Dec. 15, 2006 Notice of Panel Decision from Pre-Appeal Brief Review; Jun. 22, 2006 Pre-Appeal Brief Request for Review; Mar. 30, 2006 final Office Action; Feb. 21, 2006 Amendment; Nov. 17, 2005 non-final Office Action; Oct. 11, 2005 Amendment; Jun. 6, 2005 Office Action; Feb. 10, 2005 Amendment; Nov. 5, 2004 non-final Office Action; all from assignee's U.S. Appl. No. 09/952,475.

Jan. 29, 2010 Notice of Allowance; Oct. 22, 2009 Amendment: Oct. 21, 2009 non-final Office Action; Jul. 16, 2009 Amendment; Jul. 6, 2009 non-final Office Action; Apr. 20, 2009 Amendment; Sep. 12, 2008 Amendment; Jun. 2, 2008 Office Action; Feb. 20, 2008 Amendment: Sep. 17, 2007 Amendment: May 17, 2007 Office Action: Feb. 12, 2007 RCE, Amendment and IDS; Feb. 5, 2007 Notice of Allowance; Jan. 5, 2007 RCE, Amendment and IDS; all from assignee'S U.S. Appl. No. 10/186,175.

* cited by examiner

Figure 4 ns. The Figure shows one such web site and one such browser merely for ease of illustration.

FINGERPRINTS AND MACHINE-READABLE CODES COMBINED WITH USER CHARACTERISTICS TO OBTAIN CONTENT OR INFORMATION

RELATED APPLICATIONS

This application is a divisional of U.S. patent application Ser. No. 11/058,917 which is a continuation of U.S. patent application Ser. No. 09/915,824, filed Jul. 26, 2001 (now abandoned), which claims the benefit of U.S. Provisional Application No. 60/220,945, filed Jul. 26, 2000. Each of these patent documents is herein incorporated by reference.

U.S. patent application Ser. No. 11/058,917 is also a continuation-in-part of each of the following U.S. patent application Ser. Nos.:

Ser. No. 10/717,211, filed Nov. 18, 2003, which is a continuation of patent application Ser. No. 09/342,688, filed Jun. 29, 1999 (now U.S. Pat. No. 6,650,761). The Ser. No. 09/342,688 application is a continuation-in-part of U.S. patent application Ser. No. 09/314,648, filed May 19, 1999 (now U.S. Pat. No. 6,681,028);

Ser. No. 09/571,422 filed May 15, 2000 (now U.S. Pat. No. 6,947,571), which claims the benefit of U.S. Provisional Patent Application Nos. 60/158,015, filed. Oct. 6, 1999, 60/163,332, filed Nov. 3, 1999, and 60/164,619, filed Nov. 10, 1999. The Ser. No. 09/571,422 application is also a continuation-in-part of each of the following U.S. patent application Nos.:

Ser. No. 09/342,689, filed Jun. 29, 1999 (now U.S. Pat. No. 6,311,214),

Ser. No. 09/342,971, filed Jun. 29, 1999 (now abandoned),

Ser. No. 09/343,104, filed Jun. 29, 1999 (now abandoned),

Ser. No. 09/531,076, filed Mar. 18, 2000,

Ser. No. 09/547,664, filed Apr. 12, 2000 (now U.S. Pat. No. 7,206,820), and

Ser. No. 09/552,998, filed Apr. 13, 2000 (now abandoned); and

Ser. No. 09/636,102 filed Aug. 10, 2000 (now abandoned).

FIELD OF THE INVENTION

The present invention relates to electronic systems and more particularly to the use of collateral data and a data base of personal characteristics to provide relevant information to a user.

BACKGROUND OF THE INVENTION

Various techniques are known for embedding collateral information in images, in files of text, in audio information and in other types of digital information. Digital watermarking (which are a particular type of steganographic data encoding) are one way of imbedding collateral information in digital files. There are many types of digital watermarks. For example, prior application Ser. No. 09/127,502, filed Jul. 31, 1998, now published as WO0007356, (which is assigned to the assignee of the present invention) shows a technique by which very fine lines can be printed on a medium to slightly change the medium's apparent tint, while also conveying digital data. Co-pending application Ser. No. 09/074,034, filed May 6, 1998, now published as WO 9953428, details how the contours of printed imagery can be adjusted to convey digital data. Issued U.S. Pat. No. 5,850,481 details how the surface of paper or other media can be textured to convey optically-detectable binary data. Issued U.S. Pat. Nos. 5,862,260, 5,841,886 and 5,809,160 detail various techniques for steganographically encoding photographs and other imagery. There are a great man other patents and a large body of literature which describe various other watermarking and steganographic techniques.

The technology and science for collecting user preferences using the internet and other data gathering mechanisms is also well developed. For example U.S. Pat. Nos. 5,918,014 and 5,933,811 and PCT publication WO 00/38074 describe systems that collect data concerning users and which then provide to the users advertisements directed to what the system decides is their particular interests and preferences. As used herein the term "user characteristics" means any information about a user's characteristics or preferences such as the type of information discussed in the article "Privacy 2000 In Web We Trust" published in the magazine "PC World", June 2000, pages 103 to 108.

Systems such as the system described in co-pending application Ser. No. 09/571,422 filed May 15, 2000, utilize collateral data stored in printed images to carry a URL (Universal Resource Locator) address (or a dynamic index to a database entry storing such addresses). When a user of the system directs a camera at an image containing the collateral data, the user's web browser is directed to a particular web site.

SUMMARY OF THE PRESENT INVENTION

The present invention provides a system where collateral information (in a file or image) is used together with information concerning a particular user's characteristics to direct a user to a particular web site. The site to which a user is directed is selected based both upon the original collateral information and based upon information from the data base of user characteristics. In one embodiment, a file or data stream includes collateral data that identifies the URL of a central web site. When a file containing the collateral data is transferred to a browser, the central web site is accessed and it interrogates a data base containing various information including user preferences. The output of the data base search is another URL that directs the browser that received the original collateral data to another web site which then sends information to the user. In an alternate embodiment, a user uses a hand held digital camera to gather information from images such as magazine covers or product boxes. The images contain digital watermarks that carry collateral data. The collateral data is used to interrogate either a local or a remote data base which contains information pertinent to the particular user's characteristics. The output from the data base is then presented to the user. Thus, the collateral data from the original images is transformed into information particularly pertinent to the particular user.

DETAILED DESCRIPTION

Figure 1:
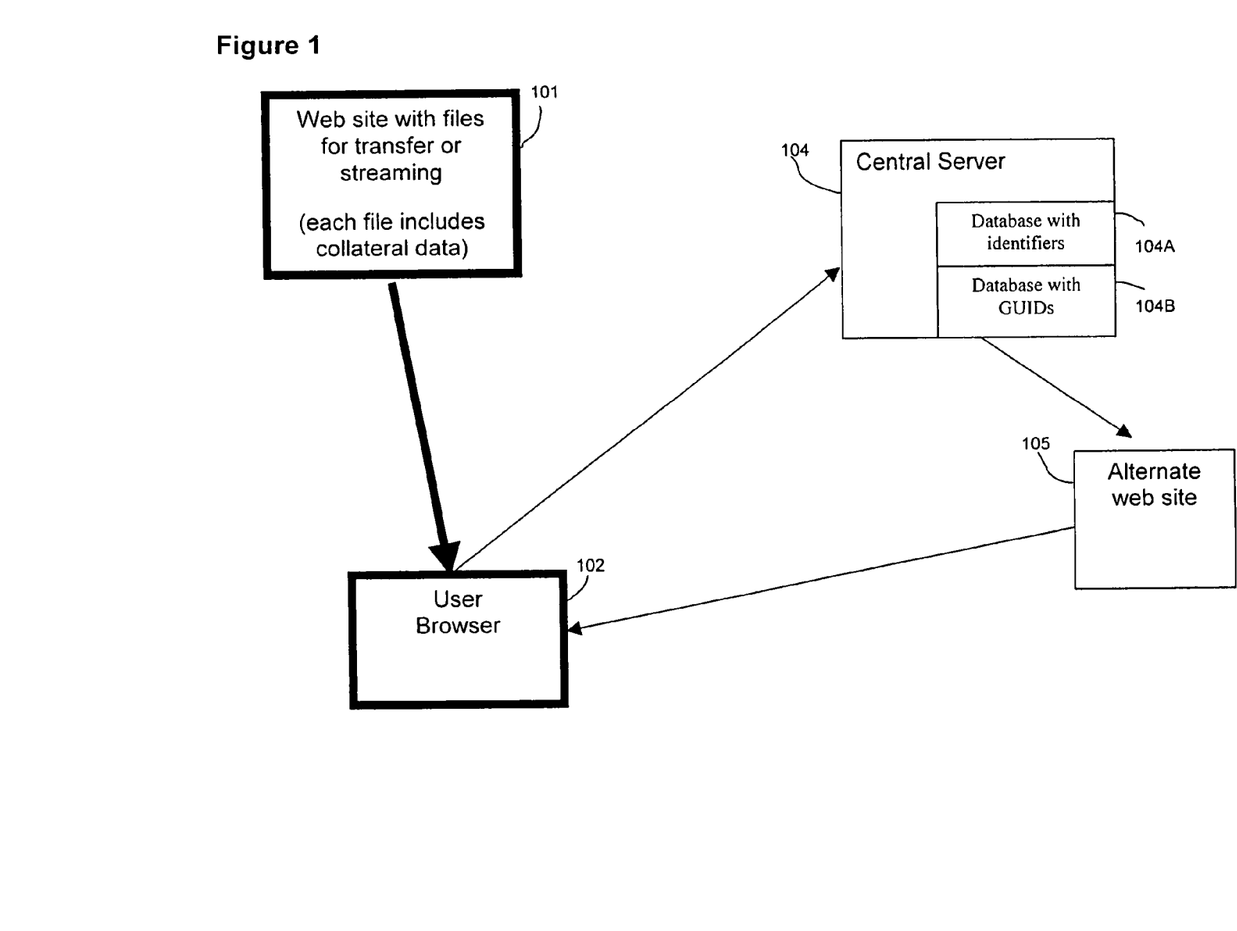
FIG. 1 is an overall system diagram of a first embodiment of the invention.

An overall system diagram of a first embodiment is shown in FIG. 1. The system includes a conventional Internet web site 101 and an Internet browser program 102 operated by a user (who is not shown in the Figure). It should be understood that when implemented on the Internet, the system would generally include many such web sites and many such browsers. The system also includes a central server 104 which includes data bases 104A and 104B. Finally the diagram shows a web site 105 which includes information of particular interest to the user of browser 102. Note, in an internet implemented system there would be a relatively large number of web sites 105, each having information for particular users that have particular sets on interest and characteristics.

The browser 102 includes a watermark reading plug in program. If a web page or a file is sent to browser 102 which contains a watermark, the watermark is detected and read by the watermark reading program in browser 102. Co-pending application Ser. No. 09/571,422 filed May 15, 2000 which is incorporated herein by reference describes such a program.

Figure 2:
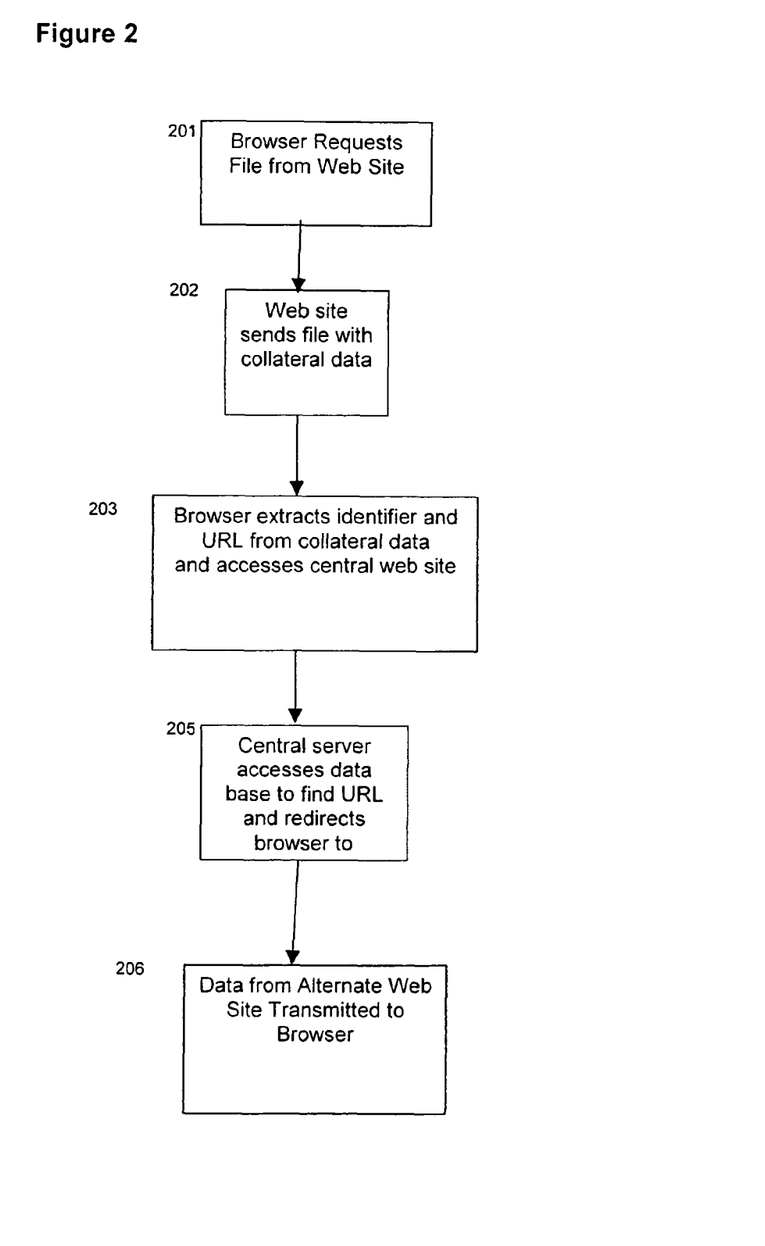
FIG. 2 is a flow diagram of the operation of the system.

The flow diagram in FIG. 2 illustrates the operation of the system. The process starts when browser 102 requests a file from web site 101. The file can be a text file, an audio file or an image file. The file stored on web site 101 includes collateral data. This data may be in the form of a watermark in an image or audio file or as meta data in any type of file. The simplest situation is if the requested web page contains a watermarked image. It should however be noted that the invention can work with other types of collateral data transferred from server 101 to browser 102, such as for example, when audio data is transferred.

As indicated by blocks 202 and 203, the file is sent to the browser and the browser extracts the collateral data from the file. If the data is in the form of a watermark in an image file or in audio data, the browser would utilize a plug-in which can read the watermark and extract the collateral data. The details of the watermark reading program per se are known in the art and are not part of the present invention.

The collateral data extracted by the watermark reading program includes the URL of central server 104 and an identifier of the file or image that contained the watermark. First data base 104A is interrogated to find information concerning the organization that registered the particular watermark. This is similar to the process described in co-pending application Ser. No. 09/571,422 filed May 15, 2000.

Central server 104 also includes a second data base 104B which is indexed according to Globally Unique Identifiers (GUIDs). These identifiers allow the system to track references that come from a particular browser 102 without obtaining or using the actual name or e-mail address of the user. Such Globally Unique Identifiers (GUIDs) are in widespread use by firms that provide advertisements on the World Wide Web. For example see an article in the magazine *PC World* June 2000, page 103 to 108 entitled "Privacy 2000 in Web We Trust". The data base 104B includes information relevant to each GUID. The information in data base 104B is acquired in a conventional manner.

The data base 104A and 104B also includes a list or data base of alternate sites 105. The data bases 104A and 104B include for each site listed, the characteristics of the users that the site owner would like to reach and the identifiers from watermarks. Thus when the collateral data in a particular image causer browser 102 to contact central server 104, the central server 104 makes two matches. First the identifier in the watermark is matched to registered identifiers to identify which particular image or web page contained the watermark. Second, from the GUID the server can determine the characteristics of the user. These two sets of information are used to determine the alternative site to which the user is directed.

The following is a very simple example which illustrates the operation of the system. Assume that the GUIDs identify only three characteristics of users that are designated "characteristic one", "characteristic two" and "characteristic three". Also assume that the watermarks read by browser 102 have only three different identifiers designated Identifier A, Identifier B and Identifier C. The alternative site 105 to which the user would be directed would be determined by server 104 from the information in data bases 104A and 104B as shown by the following table.

TABLE 1

|  | Characteristic one | Characteristic Two | Characteristic three |
|---|---|---|---|
| Identifier A | Site S1 | Site S4 | Site S7 |
| Identifier B | Site S2 | Site S5 | Site S8 |
| Identifier C | Site S3 | Site S6 | Site S9 |

The point is that server 104 has available two sets of information. The first identifies the image or file from which the collateral data was obtained and the second is the characteristics of the user. These two bits of information can be combined as shown above to select an appropriate site (above identified as sites S1 to S9) to which the user should be directed.

It is specifically noted that in any practical situation there will be many more Identifiers and many more characteristics or more probably combinations of characteristics. Furthermore, many different combinations might point to the same web site. As shown above each different combination pints to a different web site S1 to S9.

Finally as indicated by block 206 in FIG. 2, data from the selected alternate web site 105 is sent to the browser 102. The net result of the process is that the user who requests a web page or file from web site 101 will also receive certain collateral data which may be in the form of a watermark in the web page or file. This collateral data results in a request to server 104 which using the GUID of browser 102 and information from the watermark, locates an appropriate alternate web site 105. Information from the selected alternate web site 105 is then sent to browser 102.

Figure 3:
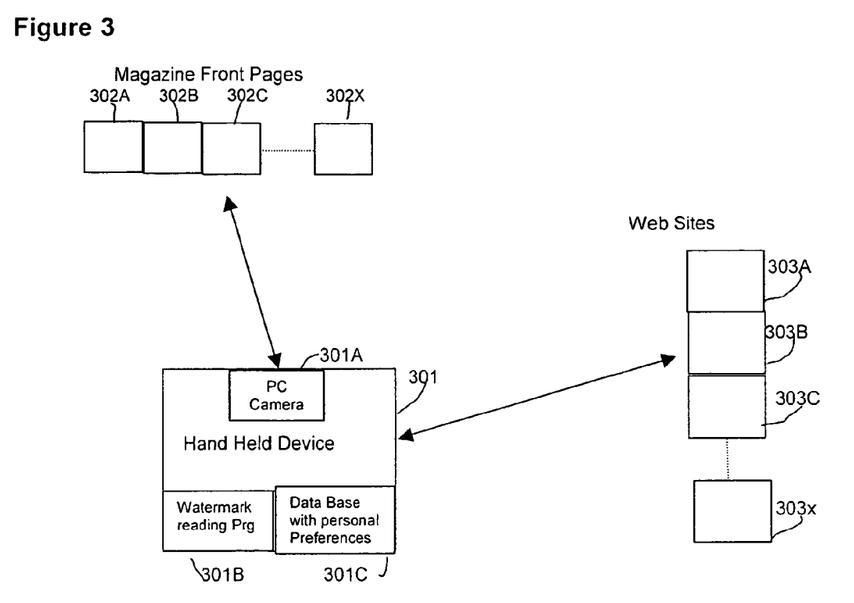
FIG. 3 is a system diagram of a second embodiment.

An alternate embodiment of the invention is shown in FIG. 3. This alternate embodiment of the invention utilizes some of the components from the Media Bridge technology commercially available from Digimarc Corporation, Tualatin Oreg. With the Media Bridge technology, one can capture a digital image and read a digital watermark which is included in the image. The digital image can be captured with a commercially available PC camera.

In the embodiment shown in FIG. 3, a PC camera 301A located in a hand held device 301 captures images, which can, for example, be the front page of magazines 302A to 302X. The hand held device includes a watermark reading program 301B and a data base 301C that stores data concerning the user's personal preferences. The hand held device 301 also includes a wireless Internet connection which can connect to a web sites 303.

Each of the magazine front page images 302A to 302X includes a digital watermark which specifies a particular URL. The camera 301A reads the watermarks in the images, 302A to 302X, obtains the information from the watermark and contacts one of the web sites 303A to 303X. The particular web sites contacted depends upon the information read from the watermarks. Each web site includes an expanded index of the information in the associated magazine. This index is sent to handheld device 301. The hand held device 301 compares the information in the expanded magazine indexes to the information in the data base 301C and informs the user which particular magazine has articles which match the personal preferences stored in data base 301C.

Thus a user can scan a rack of magazine covers with device 301. Device 301 reads the URL specified by the watermark on each magazine cover and then obtains an index of the particular magazines from a remote data base. The index is compared to the users personal preferences stored in hand held device 301 and the user is informed as to which magazine matches the stored preferences. It is noted that the designations 302A to 302X and 303A to 303X is used to illustrate that the number of magazines and the number of associated web sites is an arbitrary number suited to a particular application. The designations are meant to illustrate that there is one web site 303 (or one web page) for each magazine cover 302.

It is noted that as new issues of the various magazines appear, the information in web sites 303A to 303X change. Each magazine therefore has an identifier which directs the system to a particular web site. The web site will have the current information for that magazine.

The present embodiment goes to a different web site for each magazine index. It noted that the various magazine indexes could be stored as different web pages on a single web site.

In an alternate embodiment, the watermarks on the magazine images includes coded information about the content of the magazines. The hand held device can then compare the magazine content to the stored preferences and indicate a match without accessing a web site. In another alternate embodiment, the content can be stored in the hand held device and periodically synchronized with a remote source.

It should be specifically noted that while the foregoing specification focuses on applications employing digital watermarking, the present invention can alternatively employ other data encoding techniques, including 1D and 2D barcodes, magnetic ink character recognition (MICR), optical character recognition (OCR), optical mark recognition (OMR), radio frequency identification (RF/ID), UV/IR identification technologies, data glyphs, organic transistors, magnetic stripe, etc., depending on the particular application requirements.

Co-Pending application Ser. No. 09/571,422 filed May 15, 2000 describes a system that reads collateral data and which has a router and registration data base to determine an appropriate URL when a particular object is viewed. The content of application Ser. No. 09/571,422 filed May 15, 2000 is hereby incorporated herein by reference. The present invention can be applied as an extension of the system shown in application Ser. No. 09/571,422 filed May 15, 2000.

Figure 4:
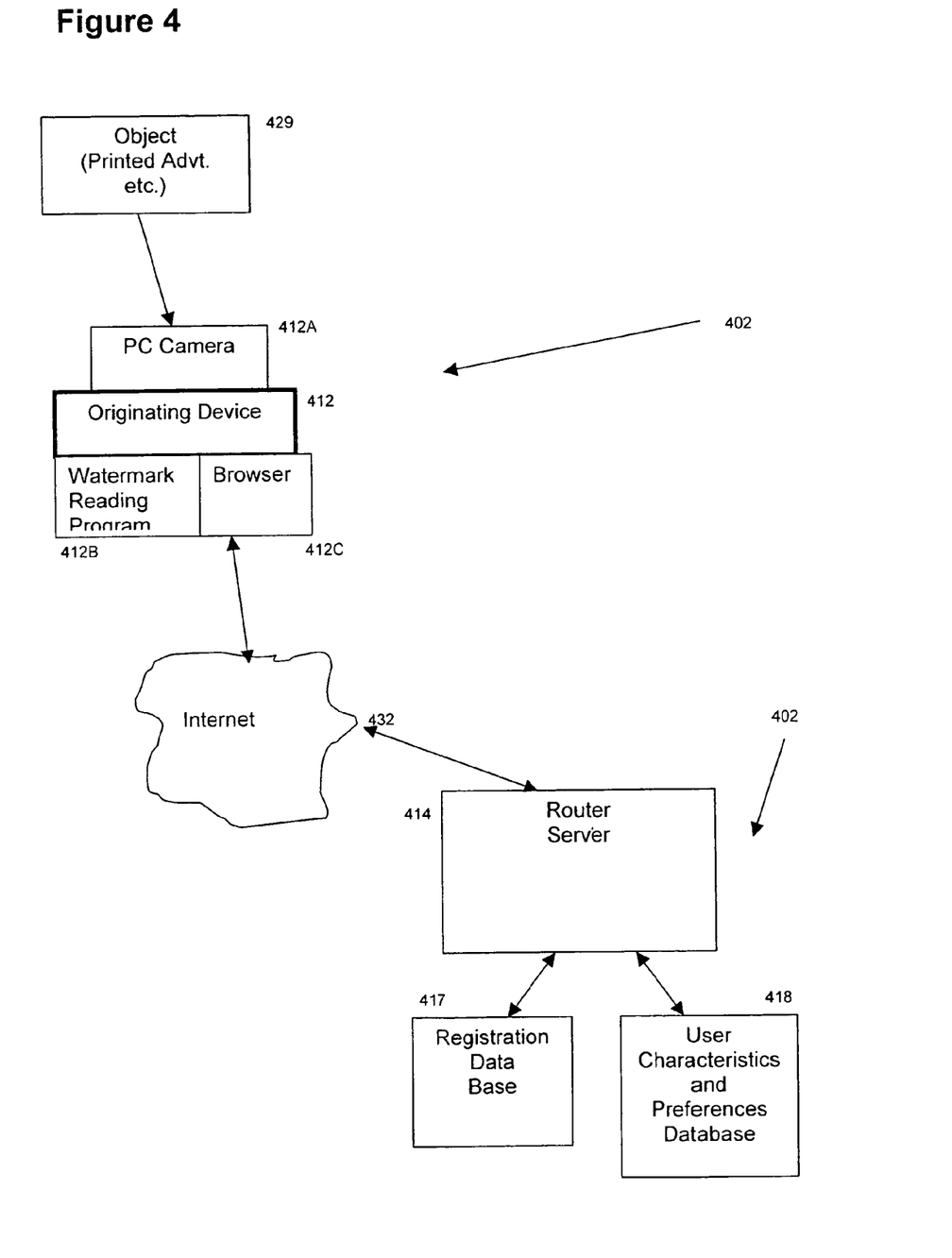
FIG. 4 illustrates another embodiment of the invention.

FIG. 4 illustrates another alternate embodiment of the present invention. With the system shown in FIG. 4, there is equipment 401 at a remote location connected to equipment 402 which is at a central location. A user operates an originating device 412 at the remote location. The originating device 412 includes a PC camera 412A which can acquire an electronic image of a printed advertisement 429. The originating device 412 includes a watermark reading program 412B and an internet browser 412C.

The collateral data read from the electronic image generated by camera 412A is used to generate a URL which directs the browser 412C to server 414 via the internet 432. When server 414 receives a request from originating device 412, it uses the GUID information to interrogate a data base 418 which contains information about users. The server 414 also interrogates a registration data base 417 which contains information relevant to the particular collateral data read from the object 429. These two sets of information are combined as illustrated by the simple example in table 1 above.

The sever can therefore respond to a request from originating device 412 by directing the browser 412C to a web site (not shown in FIG. 4) which is determined by both the collateral data in the object 429 and the user's characteristics and preferences in data base 418.

The content of data base 418 can be generated in any of the ways known in the art for obtaining information about particular users. It should be noted that as used herein the term "user characteristics" means any information about a user's characteristics, preferences, interests, patterns or habits. Furthermore, the term "user" in general means the person that operates or utilizes a particular terminal or system.

It is noted that in some embodiments, the system has two data bases, one of which has information relative to the user and one of which has information concerning the detected collateral data. While such embodiments have two data bases, it should be understood that these two data bases can be implemented as and considered to be a single data base. Thus, as used herein the term data base can be understood to mean a single data base or combination of multiple databases.

It should also be noted that the invention may be extended to other forms of media data such as audio and video data. For example, as a user listens to music or watches a video, digital watermarks imperceptibly embedded in the audio or video carry collateral data used to interrogate data bases and retrieve information pertinent to the particular listener or viewer.

Alternative implementations of the invention use fingerprints of the content, such as a hash of perceptually relevant features of the content, to derive a content identifier from which information particular to the user can be fetched and returned. While digital watermarks embed auxiliary data imperceptibly in the content by subtly modifying it, fingerprints are dynamically derived from the content and do not require embedding of auxiliary data. Both digital watermarks and fingerprints can be used in combination to look up related information and to find information particular to the user.

While the invention has been shown and described with respect to several different embodiments, it is noted that many other changes in form and detail can be made without departing from the sprit and scope to the invention.

What is claimed is:

1. A system comprising:
    a sensor configured to acquire electronic data corresponding to audio or an image, wherein the audio or image comprises a steganographic watermark embedded therein;
    a processor programmed with instructions configured to read the embedded steganographic watermark from the electronic data;
    a memory having a unique identifier that uniquely identifies a browser; and
    wherein the processor is further programmed with instructions configured to:
        communicate with a network resource, wherein the communication comprises a resource locator contained within the watermark and the unique identifier, wherein the network resource identifies a network location based at least in part on the resource locator and user characteristics, wherein the user characteristics are associated with the unique identifier, and wherein the user characteristics comprise user history;
        receive communication instructions from the network resource comprising the network location; and
        access remotely located content on the network resource.

2. The system of claim 1, wherein the user characteristics comprise preferences.

3. The system of claim 1, wherein the user characteristics comprise at least access rights.

4. The system of claim 1, wherein communication with the network resource is done wirelessly.

5. The system of claim 1, wherein the processor is further programmed with instructions configured to provide a web browser.

6. The system of claim 1, wherein the image comprises a photograph.

7. The system of claim 1, wherein the steganographic watermark comprises digital watermarking.

8. A method comprising:
acquiring electronic data corresponding to audio or an image, wherein the audio or image comprises a steganographic watermark embedded therein;
communicating with a network resource, wherein the communication comprises a resource locator contained within the watermark and a unique identifier that uniquely identifies a browser, wherein the network resource identifies a network location based at least in part on the resource locator and user characteristics, wherein the user characteristics are associated with the unique identifier, wherein the user characteristics comprise user history;
receiving communication instructions from the network resource comprising the network location; and accessing remotely located content on the network resource.

9. The method of claim 8, wherein the user characteristics comprise preferences.

10. The method of claim 8, wherein the user characteristics comprise at least access rights.

11. The method of claim 8, wherein communication with the network resource is done wirelessly.

12. The method of claim 8, further comprising providing a web browser.

13. The method of claim 8, wherein the image comprises a photograph.

14. The method of claim 8, wherein the steganographic watermark comprises digital watermarking.

15. A non-transitory computer-readable medium having instructions stored thereon, the instructions comprising:
instructions to acquire electronic data corresponding to audio or an image, wherein the audio or image comprises a steganographic watermark embedded therein;
instructions to communicate with a network resource, wherein the communication comprises a resource locator contained within the watermark and a unique identifier the uniquely identifies a browser, wherein the network resource identities a network location based at least in part on the resource locator and user characteristics, wherein the user characteristics are associated with a unique identifier, and wherein the user characteristics comprise user history;
instructions to receive communication instructions from the network resource comprising the network location; and
instructions to access remotely located content on the network resource.

16. The non-transitory computer-readable medium of claim 15, wherein the user characteristics comprise preferences.

17. The non-transitory computer-readable medium of claim 15, wherein the user characteristics comprise at least access rights.

18. The non-transitory computer-readable medium of claim 15, wherein communication with the network resource is done wirelessly.

19. The non-transitory computer-readable medium of claim 15, further comprising instructions to provide a web browser.

20. The non-transitory computer-readable medium of claim 15, wherein the image comprises a photograph.

* * * * *

UNITED STATES PATENT AND TRADEMARK OFFICE
CERTIFICATE OF CORRECTION

PATENT NO. : 8,543,661 B2  
APPLICATION NO. : 13/337511  
DATED : September 24, 2013  
INVENTOR(S) : Rhoads et al.

Page 1 of 1

It is certified that error appears in the above-identified patent and that said Letters Patent is hereby corrected as shown below:

On Title Page 5, in item (56), under "OTHER PUBLICATIONS", in Column 2, Line 2, delete "assignee'S" and insert -- assignee's --, therefor.

In the Specification

In Column 1, Line 25, delete "filed." and insert -- filed --, therefor.

Signed and Sealed this  
First Day of April, 2014

Michelle K. Lee  
*Deputy Director of the United States Patent and Trademark Office*